(12) United States Patent
Ishikawa

(10) Patent No.: US 6,467,375 B1
(45) Date of Patent: Oct. 22, 2002

(54) FLEXIBLE MESHING TYPE GEAR DEVICE HAVING DEFLECTION MESHING INVOLUTE TOOTH PROFILE

(75) Inventor: Shoichi Ishikawa, Kanagawa-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 24 days.

(21) Appl. No.: 09/714,111

(22) Filed: Nov. 17, 2000

(30) Foreign Application Priority Data

Nov. 22, 1999 (JP) .......................................... 11-330750

(51) Int. Cl.[7] .................... F16H 33/00; F16H 35/00; F16H 37/00
(52) U.S. Cl. .................... 74/640; 74/461; 74/462
(58) Field of Search ................ 74/640, 421 R, 74/461, 462, DIG. 12

(56) References Cited

U.S. PATENT DOCUMENTS

| | | | |
|---|---|---|---|
| 2,906,143 A | | 9/1959 | Musser ........................ 74/640 |
| 4,703,670 A | * | 11/1987 | Kondo ........................ 74/640 |
| 5,271,289 A | * | 12/1993 | Baxter, Jr. .................... 74/462 |
| 5,850,765 A | * | 12/1998 | Shirasawa ..................... 74/640 |
| 6,178,840 B1 | * | 1/2001 | Colbourne et al. ........... 74/462 |

FOREIGN PATENT DOCUMENTS

| | | |
|---|---|---|
| JP | 45-41171 | 12/1970 |
| JP | 7-167288 | 7/1995 |

* cited by examiner

*Primary Examiner*—Richard M. Lorence
*Assistant Examiner*—Tisha D. Lewis
(74) *Attorney, Agent, or Firm*—Burns, Doane, Swecker & Mathis, L.L.P.

(57) ABSTRACT

A flexible meshing type gear device has a rigid internal gear, a flexible external gear disposed inside the internal gear and a wave generator for flexing the external gear into an elliptical shape. One circle of curvature at the point of contact of the involute curve making contact at the meshing center position is made coincident with a tooth profile circle of curvature satisfying the Euler-Savary equation that applies between the tooth profile curvatures at the tooth profile contact points of speed change gears, and the other tooth profile circle of curvature of the equation is defined in the vicinity of the circle of curvature of the other involute curve.

5 Claims, 5 Drawing Sheets

(a) (b) (c)

US 6,467,375 B1

FLEXIBLE MESHING TYPE GEAR DEVICE HAVING DEFLECTION MESHING INVOLUTE TOOTH PROFILE

BACKGROUND OF THE INVENTION

1. Field of the Invention

This invention relates to a flexible meshing type gear device, particularly to the shape of the teeth of a rigid internal gear and a flexible external gear used in the device.

2. Background Art

From the time of the invention of the flexible meshing type gear device by C. W. Musser (U.S. Pat. No. 2,906,143) up to the present, Musser and many other researchers, including the inventor of the invention described in this specification, have proposed various innovations. The variety of improvements in tooth profile proposed alone is considerable.

Regarding the tooth profile of the flexible meshing type gear device, the present inventor earlier proposed a tooth profile design method that uses rack-approximation of meshing between the teeth of the rigid internal gear and the flexible external gear to derive a deddendum profile enabling wide range tooth meshing between the two gears (see JP-B 45-41171). The inventor also invented a method for avoiding tooth profile interference caused by rack approximation (JP-A 7-167228).

There is a strong demand in the market for flexible meshing type gear devices that offer better performance at a lower price. On the performance side, a particular need is felt for improvement in load capacity. The main factors governing the load capacity of a flexible meshing type gear device are the rim of the flexible external gear tooth root and the rolling contact surface of the inner ring of the wave generator, particularly in the vicinity of the major axis.

One object of this invention is to provide a flexible meshing type gear device whose performance is enhanced by reducing the stress produced by these two factors. Another object of this invention is to provide a flexible meshing type gear device that is also low in machining cost, including tool cost, owing to the adoption of an involute curve as a basic tooth profile.

SUMMARY OF THE INVENTION

The present invention achieves the foregoing object by adopting negative deflection that makes the flexing of the flexible gear smaller than standard and separates most of tooth meshing region from the vicinity of the major axis of the ellipse, thereby preventing superimposition of the bending stress produced in the vicinity of the major axis by the elliptical deformation of the rim of the flexible external gear and the tensile stress produced in the rim by tooth flank load, and further by uniformly distributing the spherical load of the wave generator.

In order to reduce machining cost, this invention, concurrently with the foregoing, also adopts an involute tooth profile as the basic tooth profile to apply the Euler-Savari equation that holds for tooth meshing in speed change gears and thus determine the tooth profile specifications to ensure meshing continuity.

Specifically, the present invention provides a flexible meshing type gear device having a rigid internal gear, a flexible external gear disposed inside the internal gear and a wave generator for flexing the external gear into an elliptical shape to cause the flexible external gear to mesh with the rigid internal gear at extremities of the major axis of the elliptical shape and rotate the two meshing positions in the circumferential direction, which flexible meshing type gear device is characterized in that:

the rigid internal gear and the flexible external gear are both basically spur gears, the number of teeth of the flexible external gear is 2n (n being a positive integer) fewer than the number of teeth of the rigid internal gear, a cross-section taken perpendicular to the axis of the flexible external gear at an arbitrarily selected location in the direction of the tooth trace is defined as a main cross-section, a position spaced from the major axis of the neutral curves of the elliptical rim of the flexible external gear in the main cross-section by an arbitrarily selected displacement angle of not greater than 45 degrees is defined as the tooth meshing center position, the basic shapes of the tooth profiles forming the main portion of the mesh of the two gears are defined as involute curves, one circle of curvature at the point of contact of the involute curve making contact at the meshing center position is made coincident with a tooth profile circle of curvature satisfying the Euler-Savary equation that applies between the tooth profile curvatures at the tooth profile contact points of speed change gears, and another tooth profile circle of curvature of the equation is defined in the vicinity of the circle of curvature of another involute curve.

The tooth crests of the two gears are preferably modified to form a continuously meshed state of the teeth at positions spaced from the major axis in a section perpendicular to the axis of the flexible external gear.

Known flexible external gears include cup-like and silk-hat-like flexible external gears that comprise a cylindrical body, a diaphragm extending radially inward from one end of the cylindrical body, and external teeth formed on an opening portion at the other end of the cylindrical body. When this type of flexible external gear is used, the wave generator elliptically flexes cross-sections of the flexible external gear perpendicular to its axis so that the amount of flexing increases from the diaphragm toward the opening portion approximately in proportion to the distance from the diaphragm.

In this case, it is preferable to modify the tooth crests of both gears and/or to apply relieving to the teeth from the main cross-section of the flexible external gear toward the opening portion and toward the diaphragm side in order to form a continuously meshed state of the teeth at positions spaced from the major axis in sections perpendicular to the axis of the flexible external gear in a region centered on the main cross-section.

In an embodiment of the present invention, the main portion of the tooth profile of the rigid internal gear is defined as an involute curve and the tooth profile of the flexible external gear at the main meshing position in the main cross-section is defined as a circle of curvature determined by the Euler-Savary equation that holds in speed change gears.

DETAILED DESCRIPTION OF THE PREFERRED EMBODIMENT

An embodiment of the invention will be explained with reference to the drawings in which the difference in number of teeth between the rigid internal gear and the flexible external gear is 2n (n being a positive integer) and the shape of the rim neutral curve of the flexible external gear is an approximated ellipse obtained by superimposing on a true circle of radius $r_n$ a sine wave having a total amplitude of 2κm (κ being a flexing coefficient and m being a module) and a frequency equal to one half the circumference.

Figure 1:
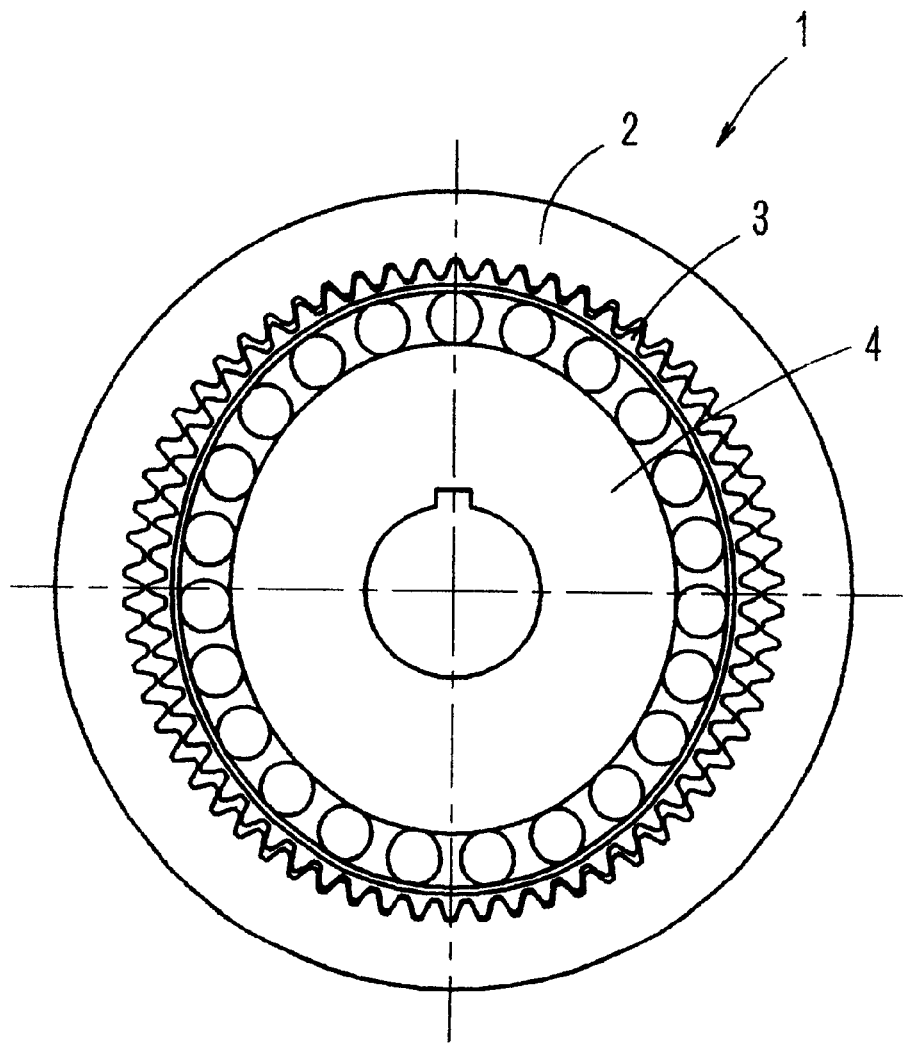
FIG. 1 is schematic front view of a conventional flexible meshing type gear device.

FIG. 1 is a front view of a conventional flexible meshing type gear device 1 in which the difference in number of teeth is 2(n=1). The device 1 has an annular rigid internal gear 2, a flexible external gear 3 disposed inside the rigid internal gear 2 and a wave generator 4 of elliptical profile fitted inside the flexible external gear 3.

Figure 2:
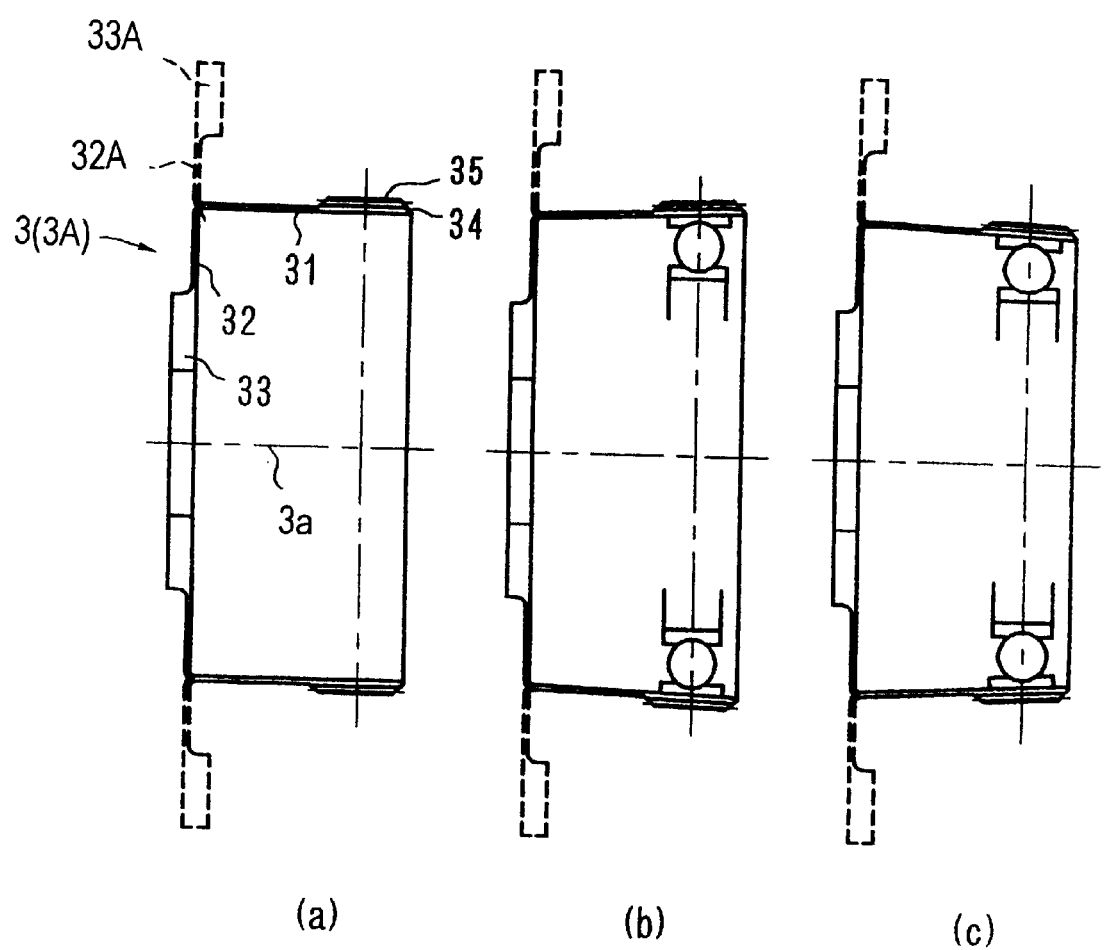
FIG. 2 is a set of diagrams for explaining how a cup-shaped or silk-hat-shaped flexible external gear is flexed, in which (a) is a section through the axis before deformation, (b) is a section through the axis including the major axis of the gear, and (c) is a section through the axis including the minor axis.

FIG. 2 is a set of diagrams showing sections of cup-like (drawn in solid lines) and silk-hat-like (broken lines) flexible external gears including their axes with the opening portions flexed into elliptical shape, wherein (a) shows the shape before deformation, (b) is a section including the major axis of the elliptical curve, and (c) is a section including the minor axis. In the drawings, the cup-like flexible external gear 3 drawn in solid lines comprises a cylindrical body 31, an annular diaphragm 32 formed to extend radially inward from one end of the cylindrical body 31, a thick boss 33 formed integrally at the center of the diaphragm 32, and external teeth 35 formed on the outer periphery of the opening portion 34 at the other end of the cylindrical body 31. The silk-hat-like flexible external gear 3A drawn in broken lines has the same structure as regards the cylindrical body 31 and external teeth 35 formed on the outer peripheral surface of the opening portion 34, but differs in that its diaphragm 32A is of annular shape extending radially outward from one end of the cylindrical body 31 and has an annular boss 33A formed continuously with its outer periphery.

The flexible external gear of either shape is flexed by the wave generator 4 of elliptical profile fitted therein such that sections thereof perpendicular to its axis 3a experience amounts of flexing that increase from the inner side of the diaphragm toward opening portion 34 approximately in proportion to the distance from the inner side of the diaphragm.

Figure 3:
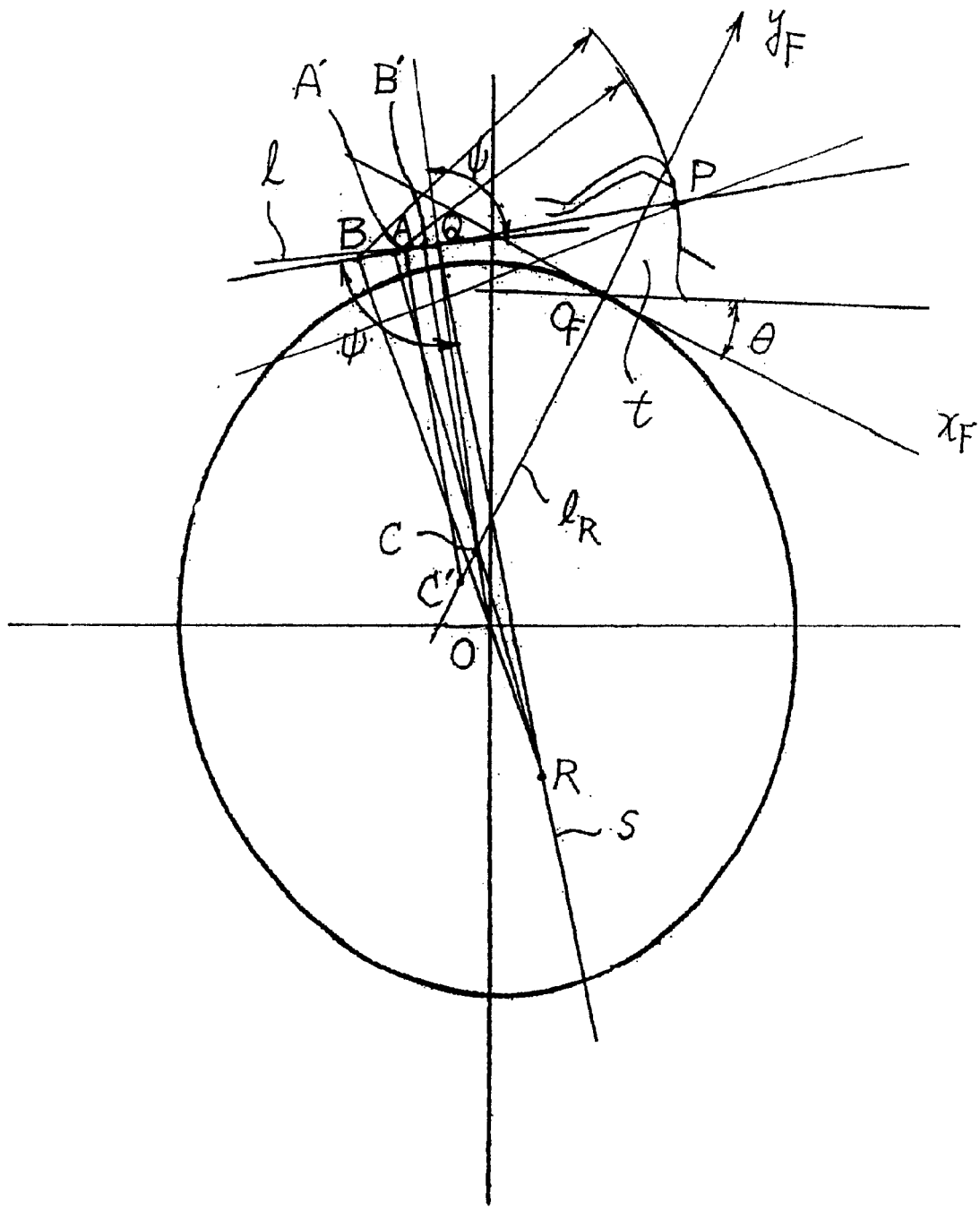
FIG. 3 is a diagram for explaining the structural physics of tooth meshing between a flexible external gear and a rigid internal gear, which constitutes the basis of tooth profile formation in an embodiment of the invention.

FIG. 3 an explanatory diagram representing a section taken perpendicularly to the axes of the two gears at an arbitrarily determined position in the direction of the tooth trace, which section is defined as the main cross-section, and shows the relative movement between the two gears in the main meshing region and the relationship between the tooth profiles, these constituting the basis of tooth profile formation according to the invention. The procedure for determining tooth profile according to the invention will now be explained with reference to this figure.

First determine a main meshing region by setting the inclination angle θ of a tangent to the rim neutral circle in the range of 0° to 45°. On the tooth t of the flexible external gear corresponding to the position of $I_R$ at this time, draw the axes $x_F$, $y_F$ of an orthogonal coordinate system whose origin is the intersection point $O_F$ between the rim neutral circle and the tooth center line (which coincides with a normal $I_R$ to the rim neutral circle) so that axis $x_F$ is tangent to the rim neutral circle. Define the center of curvature of the rim neutral circle at point $O_F$ on the normal $I_R$ as C.

Carry out motion analysis by fixing the wave generator and imparting rotational velocity to the gears that is equivalent to the inverse of the gear number ratio. Point C is the instantaneous center of rotation of the tooth t of the flexible external gear at the instant of the drawing. To find the instantaneous rotational speed of the tooth t at this time, the peripheral speed of the rim neutral circle determined by the steady rotational speed of the flexible external gear is divided by the radius of curvature $CO_F$. The center of rotation of the rigid internal gear is the origin O.

The instantaneous center of relative motion between the tooth t of the flexible external gear and the rigid internal gear is therefore on an extension of line segment OC. Define this as point Q. Point Q is at a position that externally divides line segment OC by the inverse ratio of the instantaneous rotational speeds of the gears. Select point P as the point of contact of flexible external gear tooth meshing and draw straight line QP. It follows from Camus' theorem that straight line QP is the normal of the tooth profile at this time.

Next, considering the pitch curve of the tooth t of the flexible external gear and the rigid internal gear in contact at point Q (curve corresponding to the pitch circle of an ordinary gear), define the angle formed by pitch curve tangent l and line segment OQ at point Q as ψ and draw straight line s making angle ψ with QP. Take point R on s, draw lines connecting R with each of C and O, and define the points of intersection of their extensions with the tooth profile normal QP as A and B. Points A and B are the centers of curvature of the circles of curvature of the tooth profiles of the flexible external gear and the rigid internal gear (herein called "conjugate circles of curvature") and are a graphic equivalent of the Euler-Savari theorem known to hold for the tooth profile curvatures of speed change gears.

In this invention, point R is selected so that points A and B both fall on the same side of point P. In other words, the flexible external gear is given a concave tooth profile and the rigid internal gear is given a concave tooth profile. Here involute curves having a common tooth profile normal at point P are newly adopted as the tooth profile of both gears. In the drawing, point C' is taken so that $O_FC'=r_n$, perpendiculars are dropped from point C' and point O to normal QP, the feet of the perpendiculars are designated A' and B', and involute curves passing through point P are drawn so that these points are the respective center of curvature at point P. The gist of this invention resides in the fact that the points A', B' are determined near points A, B. A particularly fundamental aspect of the design is that points B and B' are made coincident.

Figure 4:
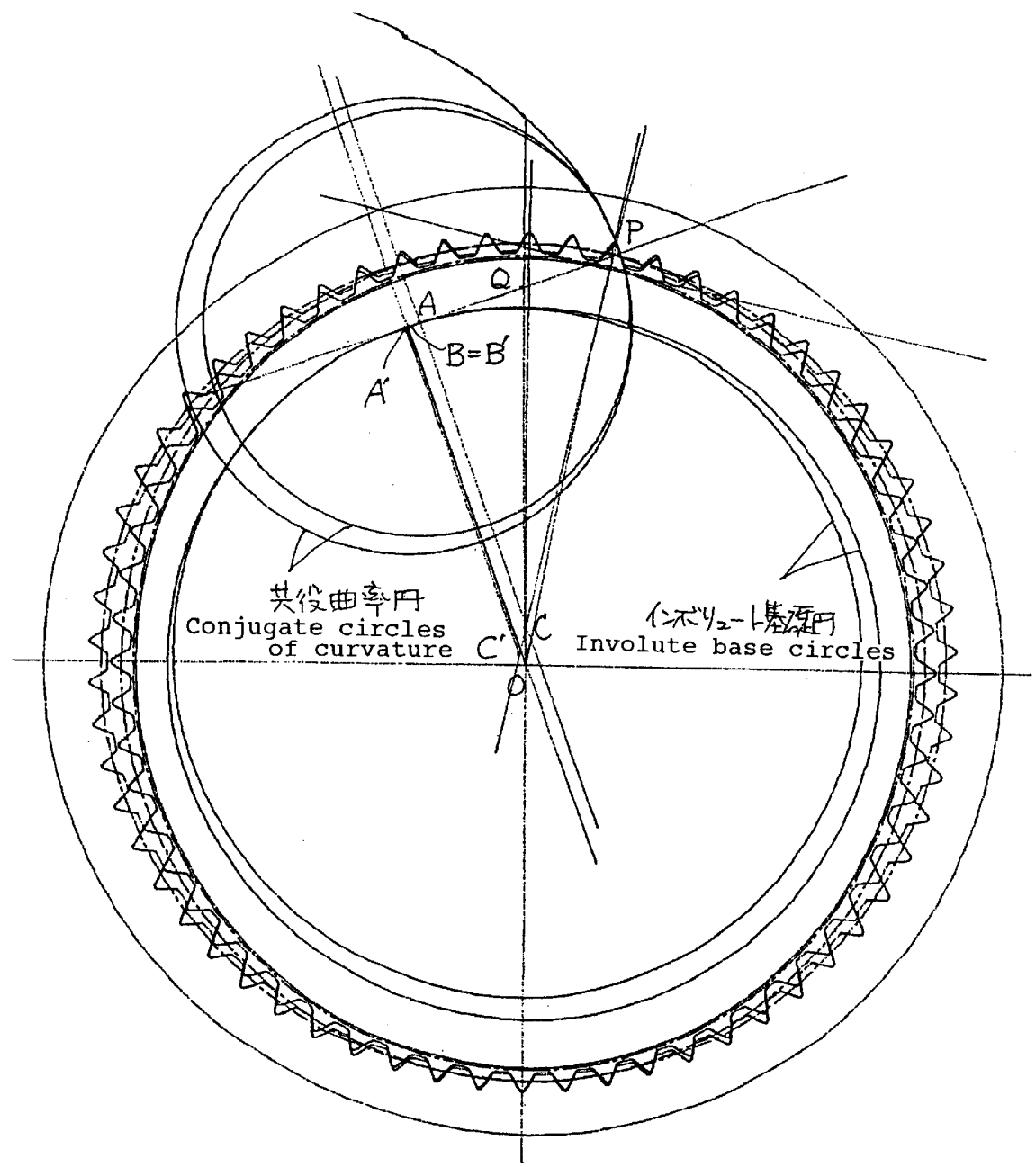
FIG. 4 is an explanatory view taken at the main cross-section of a flexible meshing type gear device showing an example of how the tooth profiles of the two gears are determined by the method of FIG. 3 and the overall state of tooth meshing.

FIG. 4 shows an example of the tooth profiles of the two gears obtained by the method of FIG. 3. The overall meshing state of the teeth is also shown. As shown in the drawing, in involute tooth profiles imparted to the rigid gear and the flexible gear, the circles of curvature of the involute tooth profiles at the main meshing point P of the rigid tooth profile are made coincident with the conjugate circles of curvature according to the Euler-Savary equation to locate the conjugate circle of curvature of the flexible gear near the circle of curvature of its involute tooth profile at meshing point P. The symbols in the drawing correspond to those in FIG. 3.

From the foregoing it follows that when involute curves whose radii of curvature at point P are PA' and PB', respectively, are adopted as the tooth profiles of the flexible external gear and the rigid internal gear, the meshing conditions in the vicinity of point P are approximately satisfied near a radius of curvature satisfying the Euler-Savari equation that holds for tooth meshing in speed change gears. At places apart from point P, some amount of gap or some amount of interference may arise with increasing proximity to the major axis and increasing proximity to the minor axis. When interference arises, smooth meshing can be achieved by appropriately correcting the tooth crest.

As can be seen from FIG. 4, meshing is centered on a location apart from the major axis (location of the tangent to the rim neutral circle having inclination angle θ determined beforehand). The maximum rim stress produced by meshing therefore appears at a place where bending stress produced by elliptical deformation is reduced, with no superimposition of the maximum rim stress produced by tooth meshing at the location of the major axis where bending stress produced by elliptical deformation of the rim of the flexible external gear is maximum. This enhances the load capacity of the flexible external gear.

Moreover, since in the flexible meshing type gear device the component of the load acting on a tooth in the radial direction is borne by the sphere of the wave generator under the tooth, the invention also has a favorable effect on the spherical load distribution of the wave generator. Specifically, incidence of maximum bending stress at the major axis owing to elliptical deformation is also the same at the inner ring of the wave generator so that a contribution can be made to reducing the spherical load in the vicinity of the major axis of the inner ring.

Figure 5:
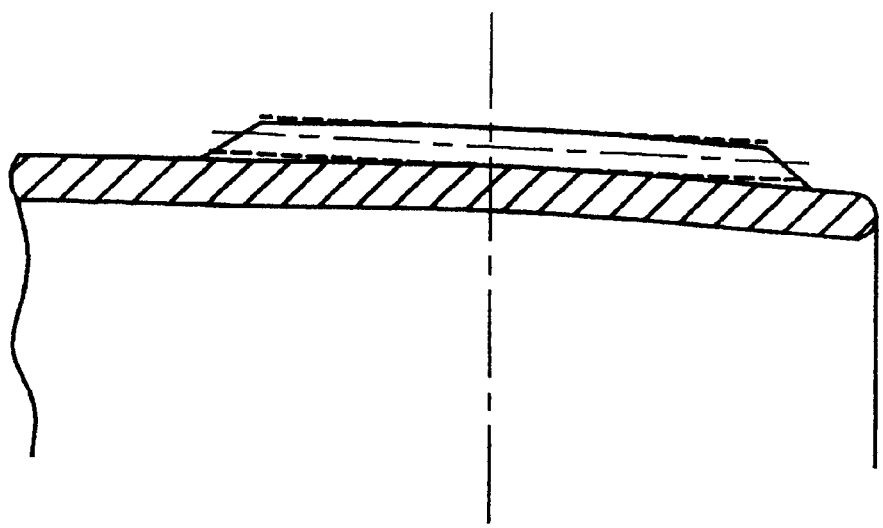
FIG. 5 is a diagram for explaining relieving applied to a tooth.

The foregoing explanation relates to the main cross-section of the flexible external gear. As regards sections apart for the main cross-section in the directions of the opening portion and the diaphragm, relieving is preferable applied as shown in FIG. 5 when necessary for avoiding tooth interference. In the case of a flat flexible meshing type gear device, however, relieving is not necessary.

As explained in the foregoing, the invention establishes the tooth meshing regions of the two gears of a flexible meshing type gear device at locations apart from the major axis of the elliptical flexible external gear. The bending stress produced in the vicinity of the major axis by the elliptical deformation and the tensile stress produced by tooth meshing are therefore prevented from being superimposed in the rim of the flexible external gear. In addition, the invention distributes the spherical load of the wave generator so that the maximum stress condition occurs at a location away from the neighborhood of the major axis. The invention therefore markedly enhances the load capacity of the flexible meshing type gear device.

The invention further utilizes the Euler-Savari equation that holds for tooth meshing in speed change gears to enable continuous contact in the region neighboring the main meshing point and adopts involute curves as the basic shape of both the convex and concave tooth profiles. The invention therefore reduces machining cost to enable production of an inexpensive flexible meshing type gear device and, by enhancing tooth flank lubrication performance, increases the durability of the device.

What is claimed is:

1. A flexible meshing type gear device having a rigid internal gear, a flexible external gear disposed inside the internal gear and a wave generator for flexing the external gear into an elliptical shape to cause the flexible external gear to mesh with the rigid internal gear at extremities of a major axis of the elliptical shape and rotate two meshing positions in the circumferential direction, which flexible meshing type gear device is characterized in that:
   the rigid internal gear and the flexible external gear are both basically spur gears,
   the number of teeth of the flexible external gear is 2n (n being a positive integer) fewer than the number of teeth of the rigid internal gear,
   a cross-section taken perpendicular to the axis of the flexible external gear at an arbitrarily selected location in the direction of a tooth trace is defined as a main cross-section,
   a position spaced from a major axis of a neutral curve of an elliptical rim of the flexible external gear in the main cross-section by an arbitrarily selected displacement angle of not greater than 45 degrees is defined as a tooth meshing center position,
   the basic shapes of tooth profiles forming the main portion of the mesh of the two gears are defined as involute curves,
   one circle of curvature at a point of contact of the involute curve making contact at the meshing center position is made coincident with a tooth profile circle of curvature satisfying the Euler-Savary equation that applies between the tooth profile curvatures at the tooth profile contact points of speed change gears, and
   another tooth profile circle of curvature of the equation is defined in the vicinity of the circle of curvature of another involute curve.

2. A flexible meshing type gear device according to claim 1, wherein the flexible external gear is a cup-like or silkhat-like flexible external gear comprising a cylindrical body, a diaphragm extending radially inward from one end of the cylindrical body, and external teeth formed on an opening portion at the other end of the cylindrical body and the wave generator elliptically flexes cross-sections of the flexible external gear perpendicular to its axis so that the amount of flexing increases from the diaphragm toward the opening portion approximately in proportion to the distance from the diaphragm.

3. A flexible meshing type gear device according to claim 1, wherein tooth crests of the two gears are modified to form a continuously meshed state of the teeth at positions spaced from the major axis in a section perpendicular to the axis of the flexible external gear.

4. A flexible meshing type gear device according to claim 2, wherein tooth crests of both gears are modified and/or relieving is applied to the teeth from the main cross-section of the flexible external gear toward the opening portion and toward the diaphragm side in order to form a continuously meshed state of the teeth at positions spaced from the major axis in sections perpendicular to the axis of the flexible external gear in a region centered on the main cross-section.

5. A flexible meshing type gear device according to claim 1, wherein the main portion of the tooth profile of the rigid internal gear is defined as an involute curve and the tooth profile of the flexible external gear at a main meshing position in the main cross-section is defined as a circle of curvature determined by the Euler-Savary equation that holds in speed change gears.

* * * * *

UNITED STATES PATENT AND TRADEMARK OFFICE
CERTIFICATE OF CORRECTION

PATENT NO. : 6,467,375 B1  
DATED : October 22, 2002  
INVENTOR(S) : Shoichi Ishikawa It is certified that error appears in the above-identified patent and that said Letters Patent is hereby corrected as shown below:

<u>Column 1,</u>  
Line 24, "deddendum" should be -- addendum --.

Signed and Sealed this

Twenty-fifth Day of February, 2003

JAMES E. ROGAN  
*Director of the United States Patent and Trademark Office*